US009491140B2

(12) United States Patent
Jeong et al.

(10) Patent No.: US 9,491,140 B2
(45) Date of Patent: Nov. 8, 2016

(54) METHOD FOR SWITCHING GATEWAYS, AND APPARATUS THEREFOR

(71) Applicant: LG ELECTRONICS INC., Seoul (KR)

(72) Inventors: Seungmyeong Jeong, Anyang-si (KR); Younsung Chu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/381,541

(22) PCT Filed: Feb. 26, 2013

(86) PCT No.: PCT/KR2013/001527
§ 371 (c)(1),
(2) Date: Aug. 27, 2014

(87) PCT Pub. No.: WO2013/129819
PCT Pub. Date: Sep. 6, 2013

(65) Prior Publication Data
US 2015/0047011 A1 Feb. 12, 2015

Related U.S. Application Data

(60) Provisional application No. 61/604,528, filed on Feb. 29, 2012, provisional application No. 61/662,935, filed on Jun. 22, 2012, provisional application No. 61/692,709, filed on Aug. 24, 2012, provisional application No. 61/695,303, filed on Aug. 31, 2012, provisional application No. 61/702,226, filed on Sep. 17, 2012.

(51) Int. Cl.
*H04L 29/06* (2006.01)
*H04L 12/64* (2006.01)
(Continued)

(52) U.S. Cl.
CPC ............ *H04L 63/02* (2013.01); *H04L 12/6418* (2013.01); *H04L 51/18* (2013.01); *H04W 4/203* (2013.01)

(58) Field of Classification Search
CPC ... H04L 63/08; H04L 63/0884; G06F 21/45; H04W 4/203
See application file for complete search history.

(56) References Cited

U.S. PATENT DOCUMENTS

2011/0090886 A1* 4/2011 Park ...................... H04W 4/203
370/338
2011/0093704 A1* 4/2011 Park ...................... H04W 12/08
713/168
(Continued)

FOREIGN PATENT DOCUMENTS

KR  10-2012-0008354  1/2012
WO  2011/155733  12/2011

OTHER PUBLICATIONS

Open Mobile Alliance, Converged Personal Network Service Requirements, Nov. 17, 2009, OMA, Ver. 1.0, pp. 1-36.*
(Continued)

*Primary Examiner* — Kari Schmidt
*Assistant Examiner* — Fahimeh Mohammadi
(74) *Attorney, Agent, or Firm* — Lee, Hong, Degerman, Kang & Walmey; Jonathan Kang; Michael Monaco

(57) ABSTRACT

The present invention relates to a converged personal network service (CPNS). More particularly, the present invention relates to a method for switching a personal network (PN) gateway in a PN from a first device to a second device, including the steps of: the first device transmitting, to the second device, a first message requesting PN gateway switching; the first device receiving a second message from the second device in response to the first message; and the first device authenticating the PN gateway when the second message includes a value indicating success, as well as to an apparatus therefor.

4 Claims, 9 Drawing Sheets

(51) Int. Cl.
*H04L 12/58* (2006.01)
*H04W 4/20* (2009.01)

(56) References Cited

U.S. PATENT DOCUMENTS

| | | | | |
|---|---|---|---|---|
| 2011/0183760 | A1* | 7/2011 | Kim | H04L 67/1095 463/40 |
| 2011/0207403 | A1* | 8/2011 | Kim | H04W 12/06 455/41.1 |
| 2011/0231547 | A1* | 9/2011 | Yang | H04W 4/00 709/224 |
| 2011/0307620 | A1* | 12/2011 | Park | H04L 12/2809 709/229 |
| 2012/0052863 | A1* | 3/2012 | Chien | H04W 4/203 455/436 |
| 2012/0110137 | A1* | 5/2012 | Yang | H04W 4/08 709/219 |
| 2012/0151011 | A1* | 6/2012 | Yang | H04W 8/22 709/219 |
| 2013/0077532 | A1* | 3/2013 | Deprun | H04W 76/00 370/255 |
| 2013/0308527 | A1* | 11/2013 | Chin | H04W 76/06 370/328 |

OTHER PUBLICATIONS

Jeonghoon Lee et al., Next Generation Mobile Technology & Standardization Conference, Nov. 17, 2010, OMA, pp. 1-22.*
Ryuji Wakikawa et al., Design of Vehicle Network: Mobile Gateway for MANET and NEMO Converged Communication, 2005, ACM, pp. 81-82.*
Stan Moyer et al., The Impact of Network Convergence on Telecommunications Software, Jan. 2001, IEEE, pp. 78-84.*
PCT International Application No. PCT/KR2013/001527, Written Opinion of the International Searching Authority dated Jun. 14, 2013, 1 page.
Jeong, et al., "PN GW Mode Switching High Level Procedure," Open Mobile Alliance (OMA), XP064137076, Jul. 2012, 3 pages.
Lee, et al., "PN PNGW Management," Open Mobile Alliance (OMA), XP064035902, Nov. 2010, 5 pages.
European Patent Office Application Serial No. 13754729.5, Search Report dated Oct. 27, 2015, 7 pages.

* cited by examiner

METHOD FOR SWITCHING GATEWAYS, AND APPARATUS THEREFOR

CROSS-REFERENCE TO RELATED APPLICATIONS

This application is the National Stage filing under 35 U.S.C. 371 of International Application No. PCT/KR2013/001527, filed on Feb. 26, 2013, which claims the benefit of U.S. Provisional Application Ser. No. 61/604,528, filed on Feb. 29, 2012, 61/662,935, filed on Jun. 22, 2012, 61/692,709, filed on Aug. 24, 2012, 61/695,303, filed on Aug. 31, 2012, and 61/702,226, filed on Sep. 17, 2012, the contents of which are all hereby incorporated by reference herein in their entirety.

TECHNICAL FIELD

The present invention relates to a converged personal network service (CPNS).

BACKGROUND ART

Demands for connected devices using a short-range personal network such as a home network, an in-car network, and a body area network have gradually increased. A personal network (PN) can be connected to other networks through a PN gateway (PN GW), which can largely expand an access range of a device that operates as a personal network element (PNE) of the PN. In addition, PNEs can access services outside the PN and thus can use more useful services. For example, a personal media player (PMP) that supports Bluetooth can be connected to a portable phone via Bluetooth and can be connected with the Internet to receive a video stream.

Likewise, in order to provide an application layer that supports ubiquitous access for services via a converged network, open mobile alliance (OMA) has discussed a specification for a converged personal network service (CPNS).

DISCLOSURE

Technical Problem

An object of the present invention devised to solve the problem lies in a method for effectively switching a gateway in a converged network and a device therefor.

Another object of the present invention devised to solve the problem lies in a method for switching a gateway in a converged network and a device therefor, by which a user cannot recognize service suspension during gateway switching in a converged network.

Another object of the present invention devised to prevent unnecessary service suspension during gateway switching in a converged network.

It is to be understood that both the foregoing general description and the following detailed description of the present invention are exemplary and explanatory and are intended to provide further explanation of the invention as claimed.

Technical Solution

The object of the present invention can be achieved by providing a method for switching a personal network gateway (PN GW) in a personal network (PN) to a first device from a second device, the method including the first device transmitting a first message for request of PN GW switching to the second device, the first device receiving a second message from the second device in response to the first message, and the first device performing PN GW authentication when the second message includes a value indicating success.

The method may further include a device switching a mode to a PN GW mode or a BOTH mode prior to the performing of the PN GW authentication when the second message includes the value indicating success, wherein the PN GW authentication is performed by a PN GW entity of the first device.

The first message may include first mode information indicating a mode of the first device after PN GW switching and second mode information indicating a mode of the second device after PN GW switching.

The first message may be transmitted to a PN GW entity of the second device from a personal network element (PNE) entity of the first device, and the second message may be transmitted to the PNE entity of the first device from the PN GW entity of the second device.

The method may further include, when the second message includes a value indicating success, the first device transmitting a third message for request of PN GW switching to a server, the first device receiving a fourth message from the server in response to the third message, and the first device transmitting a fifth message indicating PN GW switching to the second device when the fourth message includes a value indicating success, wherein the second device may suspend a converged personal network service (CPNS) provided in the PN upon receiving the fifth message.

The third message may be transmitted by a PN GW entity of the first device, the fourth message may be received by the PN GW entity of the first device, and the fifth message may be transmitted to a PN GW entity of the second device from the PN GW entity of the first device.

The method may further include the first device receiving a sixth message indicating service suspension from the second device, and the first device resuming the suspended service, wherein a mode of the second device may be switched to a PNE mode from a PN GW mode after the sixth message is transmitted.

The suspended service may be resumed by a PN GW entity of the first device.

In another aspect of the present invention, provided herein is a device for switching a personal network gateway (PN GW) in a personal network (PN), the device including a transceiving module, and a processor, wherein the processor is configured to transmit a first message for request of PN GW switching to another device, to receive a second message from the second device in response to the first message, and to perform PN GW authentication when the second message includes a value indicating success.

The processor may be further configured to switch a mode to a PN GW mode or a BOTH mode prior to the PN GW authentication when the second message includes the value indicating success, and the PN GW authentication may be performed by a PN GW entity of the device.

The first message may include first mode information indicating a mode of the device after PN GW switching and second mode information indicating a mode of the another device after PN GW switching.

When the second message includes a value indicating success, the processor may be further configured to transmit a third message for request of PN GW switching to a server, to receive a fourth message from the server in response to the third message, and to transmit a fifth message indicating PN GW switching to the second device when the fourth message includes a value indicating success, and the second device may suspend a converged personal network service (CPNS) provided in the PN upon receiving the fifth message.

The processor may be further configured to receive a sixth message indicating service suspension from the another device and to resume the suspended, and a mode of the another device may be switched to a PNE mode from a PN GW mode after the another device transmits the sixth message.

In another aspect of the present invention, provided herein is a method for switching a personal network gateway (PN GW) in a personal network (PN) to a first device from a second device, the method including the first device receiving a first message for request of PN GW switching from the second device, the first device transmitting a second message to the second device in response to the first message, and the first device performing PN GW authentication when the second message includes a value indicating success.

The method may further include a device switching a mode to a PN GW mode or a BOTH mode prior to the performing of the PN GW authentication when the second message includes the value indicating success, wherein the PN GW authentication is performed by a PN GW entity of the first device.

The first message may include first mode information indicating a mode of the first device after PN GW switching and second mode information indicating a mode of the second device after PN GW switching.

The first message may be transmitted to a PNE entity of the first device from a PNE entity of the second device, and the second message may be transmitted to the PN GW entity of the second device from the PNE entity of the first device.

The method may further include, when the second message includes a value indicating success, the first device transmitting a third message for request of PN GW switching to a server, the first device receiving a fourth message from the server in response to the third message, and the first device transmitting a fifth message indicating PN GW switching to the second device when the fourth message includes a value indicating success, wherein the second device may suspend a service provided in the PN upon receiving the fifth message.

The third message may be transmitted by a PN GW entity of the first device, the fourth message may be received by the PN GW entity of the first device, and the fifth message may be transmitted to a PN GW entity of the second device from the PN GW entity of the first device.

The method may further include the first device receiving a sixth message indicating service suspension from the second device, and the first device resuming the suspended service, wherein a mode of the second device may be switched to a PNE mode from a PN GW mode after the sixth message is transmitted.

The suspended service may be resumed by a PN GW entity of the first device.

In another aspect of the present invention, provided herein is a device for switching a personal network gateway (PN GW) in a personal network (PN), the device including a transceiving module, and a processor, wherein the processor is configured to receive a first message for request of PN GW switching from another device, to transmit a second message to the second device in response to the first message, and to perform PN GW authentication when the second message includes a value indicating success.

The processor may be further configured to switch a mode to a PN GW mode or a BOTH mode prior to the PN GW authentication when the second message includes the value indicating success, and the PN GW authentication may be performed by a PN GW entity of the device.

The first message may include first mode information indicating a mode of the device after PN GW switching and second mode information indicating a mode of the another device after PN GW switching.

When the second message includes a value indicating success, the processor may be further configured to transmit a third message for request of PN GW switching to a server, to receive a fourth message from the server in response to the third message, and to transmit a fifth message indicating PN GW switching to the second device when the fourth message includes a value indicating success, and the second device may suspend a service provided in the PN upon receiving the fifth message.

The processor may be further configured to receive a sixth message indicating service suspension from the another device and to resume the suspended, and a mode of the another device may be switched to a PNE mode from a PN GW mode after the another device transmits the sixth message.

According to the present invention, a gateway can be effectively switched in a converged network. The gateway can be switched such that a user cannot recognize service suspension during gateway switching. When switching is canceled prior to completion of the switching, unnecessary service suspension or delay of suspended service may be prevented. In addition, when switching is canceled prior to completion of the switching, a PN inventory and a service group (SG) cannot be restored or complex procedures required for restoration can be prevented.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
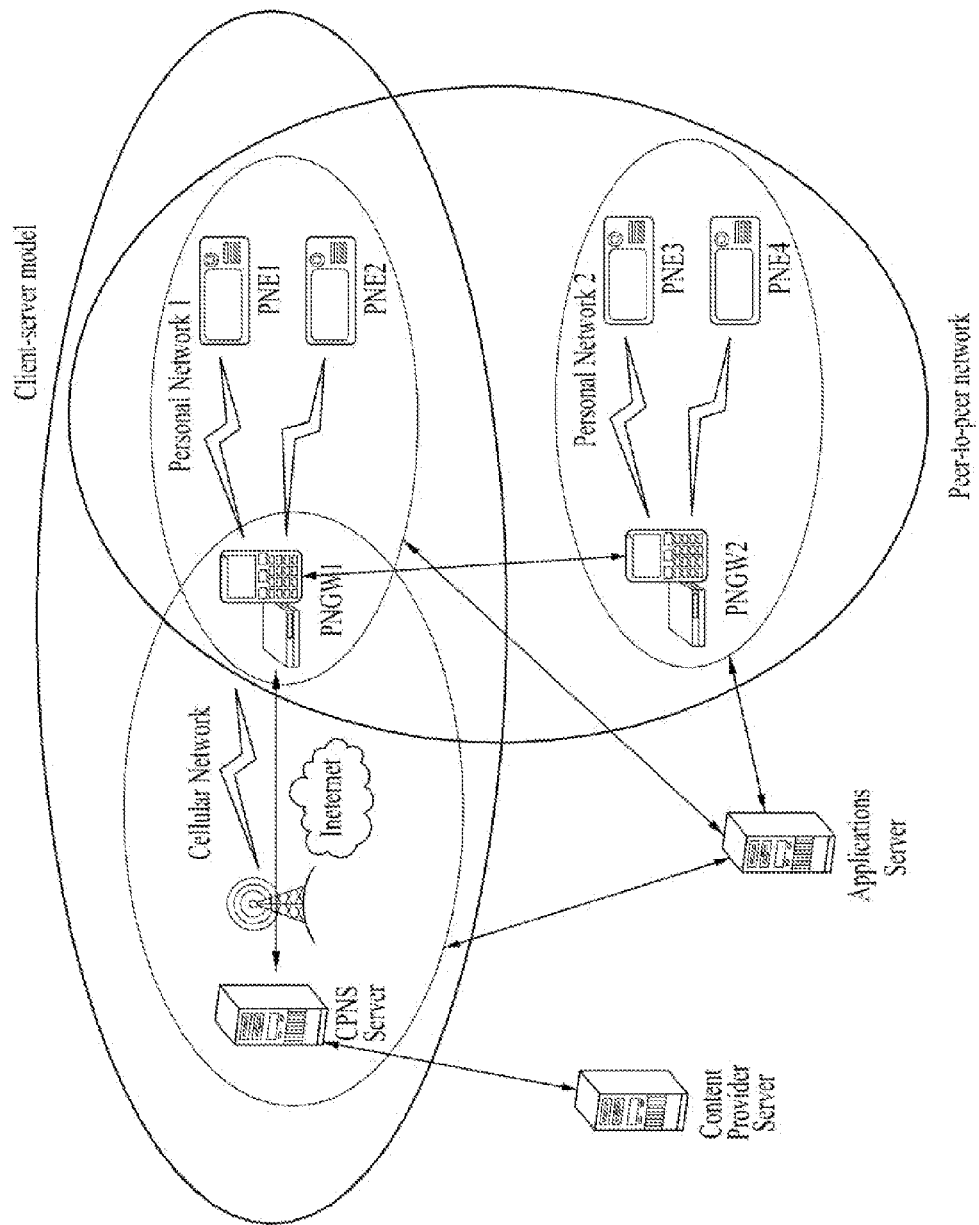
FIG. 1 illustrates a schematic structure of a converged personal network service (CPNS)

The present invention relates to a converged personal network service (CPNS). However, the present invention is not limited to only a CPNS and may be applied to any communication system and method to which the present invention is applicable.

The technical terminology used herein is for the purpose of describing particular embodiments only and is not intended to be limiting of the present invention. Unless otherwise defined, all technical terms used herein have the same meaning as commonly understood by one of ordinary skill in the art to which this present invention belongs and will not be interpreted in overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

Hereinafter, the present invention will be described in detail by explaining exemplary embodiments of the invention with reference to the attached drawings. The same reference numerals in the drawings denote like elements, and a repeated explanation thereof will not be given. The features of the present invention will be more clearly understood from the accompanying drawings and should not be limited by the accompanying drawings. In addition, it is to be appreciated that all changes, equivalents, and substitutes in addition to the accompanying drawings are encompassed in the present invention.

Hereinafter, although a portable terminal is illustrated in the accompanying drawings, a user equipment (UE) may be a non-portable such as a personal computer (PC), an on-board unit, or the like as well as a portable device having a communication function, such as a cellular phone, a personal digital assistant (PDA), a smart phone, a wireless modem, a notebook computer, etc. In addition, throughout this specification, a UE may be used to have equivalent meaning to a user equipment (UE), a mobile equipment (ME), a mobile station (MS), a user terminal (UT), a subscriber station (SS), a wireless device, a handheld device, an access terminal (AT), and a device.

DEFINITION OF TERMINOLOGY

Hereinafter, the terms used in the specification will be defined prior to the description of the present invention.

1) Converged personal network service (CPNS): A CPNS refers to various services that can be provided to devices of a personal network (PN) when the devices belong to the PN. The PN may also be referred to as a personal area network (PAN). The CPNS enables a first device of a user to integrate and manage various services that can be provided via a mobile communication network as well as to simply assign a private Internet protocol (IP) address to another device by the first device of the user. Likewise, various services may be integrated and managed by the first device of the user to share the services between various devices of the user. For example, the CPNS may refer to a service framework for a converged network formed by combining a cellular network and a personal network.

2) CPNS entity: A CPNS entity is a logical entity and there are three logical entities: a PNE entity, a PN GW entity, and a CPNS server. The CPNS server is positioned in a core network, and the PNE and the PN GW are positioned in the CPNS device. For convenience of description, throughout this specification, entities and devices may be interchangeably used. For example, throughout this specification, a PNE entity and a PN GW entity may be interchangeably used with a PNE device and a PN GW device, respectively, and may also be simply referred to as a PNE and a PN GW, respectively.

3) CPNS device: A CPNS device is a device that embeds CPNS entity(ies) and can operate in various modes in a PN. CPNS devices may have capabilities to process, store, and/or render content and have communication interfaces that enable different CPNS devices to operate in different modes in PNs. A CPNS device may include a CPNS entity. Throughout this specification, the present invention is described in terms of an entity. However, as described above, the term entity may be interchangeably used with a device. Accordingly, it is to be appreciated that operates performed by an entity can be performed by a device.

4) CPNS server: A CPNS server is a functional entity that can provides resources to CPNS entities either in response to requests or in a push mode. The CPNs registers a device and a user related service, stores corresponding information, and provides registration of a PN as a collection of devices and registration of a service group including a PN and a WAN. In addition, the CPNS server may communicate with external entities such as a content provider server. The CPNS server is an entity that configures a key for authentication of user device in order to perform a service on a CPNS framework. In addition, the CPNS server is an entity that registers an externally provided service and supports search and consumption/provision requests such that a device consumes the service.

5) Personal network (PN): A PN is a collection of devices that enable users to consume or produce services. All devices within a PN may be linked with a PN GW. The PN may be a non-static collection and may vary over time. The PN may include at least a PN GW device and a PNE device.

6) Personal network element (PNE): A PNE is a functional entity constituting a PN. The PNE may simultaneously or separately consume or provide services and/or contents. The PNE is an entity that actually consumes contents, applications, and services. The PNE is an entity that makes up a PN and constitutes a service group in a CPNS framework.

7) Personal network gateway (PN GW): A PN GW may interconnect entities that are positioned in a PN and a wide area network to establish a converged network that provides a CPNS service. In addition, the PN GW may enable a PNE to connect to a CPNS server as well as other PNEs of the same PN or another PN. This implies using a global network such as a mobile network. In addition, the PN GW manages service access to/from PNEs and transmits and receives capabilities information and information such as communication to and from a CPNS server.

8) PN inventory: A PN inventory may include information of PN(s) that belong to a specific CPNS entity. In this regard, the PN information may include attribute information of a PN and information of an entity that belong to the corresponding PN.

9) A service group: A service group is a set of PNEs and/or PN GW(s) that share the same service, data, and applications. The service group refers to a collection of entities that are registered in a server via an established PN. In this case, the service group does not have to be an entity dependent upon one PN, may include entities that are located far away from each other via various PNs and thus cannot be linked with each other, and may not include only entities that belong to the same user.

10) Zone: A zone refers to a specific zonal area.

11) Zone based service: A zone based service refers to a CPNS service that is provided in coverage of a PN GW based on a zone.

12) Zone PN GW: A zone PN GW is a PN GW that provides unique service or content in a zone.

13) Mode: A CPNS device may operate in three modes: PN GW, PNE, and BOTH. The PN GW mode is a mode in which the CPNS device operates as a PN GW. The PNE mode is a mode in which the CPNS device operates as a PNE. The BOTH mode is a mode in which the CPNS device operates as both the PN GW and the PNE. The modes in which the CPNS devices operate depend upon device capabilities, user configuration, or operator policy.

Hereinafter, prior to the description of the present invention, a CPNS will be schematically described.

FIG. 1 illustrates a schematic structure of a CPNS.

Referring to FIG. 1, a PN1 including a PNE1, a PNE2, and a PN GW1, and a PN2 including a PNE2, a PNE3, and a PN GW2 are illustrated. For example, devices of the PN1 and the PN2 may be connected to each other via a wired or wireless network such as Wi-Fi, Bluetooth, etc. In addition, each of the PN GW1 and the PN GW2 communicates with a CPNS server. For example, the PN GW1 and the PN GW2 may communicate with the CPNS server using a random wired or wireless network such as $3^{rd}$ generation (3G), long term evolution (LTE), long term evolution advanced (LTE-A), beyond LTE, WiMax, the Internet, etc.

As illustrated in FIG. 1, the PN1 and a cellular network or the Internet may form a converged network through the PN GW1. In this case, the CPNS server may provide a CPNS service to the PNE1 and the PNE2 in the PN1 through the PN GW1. In the case of such a client-server model, the CPNS service may be provided to various devices (i.e., devices that operates as PNEs) connected to a cellular phone that operates as a PN GW, through the cellular phone to expand a service provider region. In this case, PNE devices may receive various services from a content server or an application server through a PN GW. A device that operates as a PNE may be referred to as a PNE device and a device that operates as a PN GW may be referred to as a PN GW device.

In addition, as illustrated in FIG. 1, devices included in the PN1 and devices included in the PN2 may form a peer-to-peer network through the PN GW1 and the PN GW2. The peer-to-peer network may be formed to enable PNE devices belonging to different PNs to communicate with each other.

Figure 2:
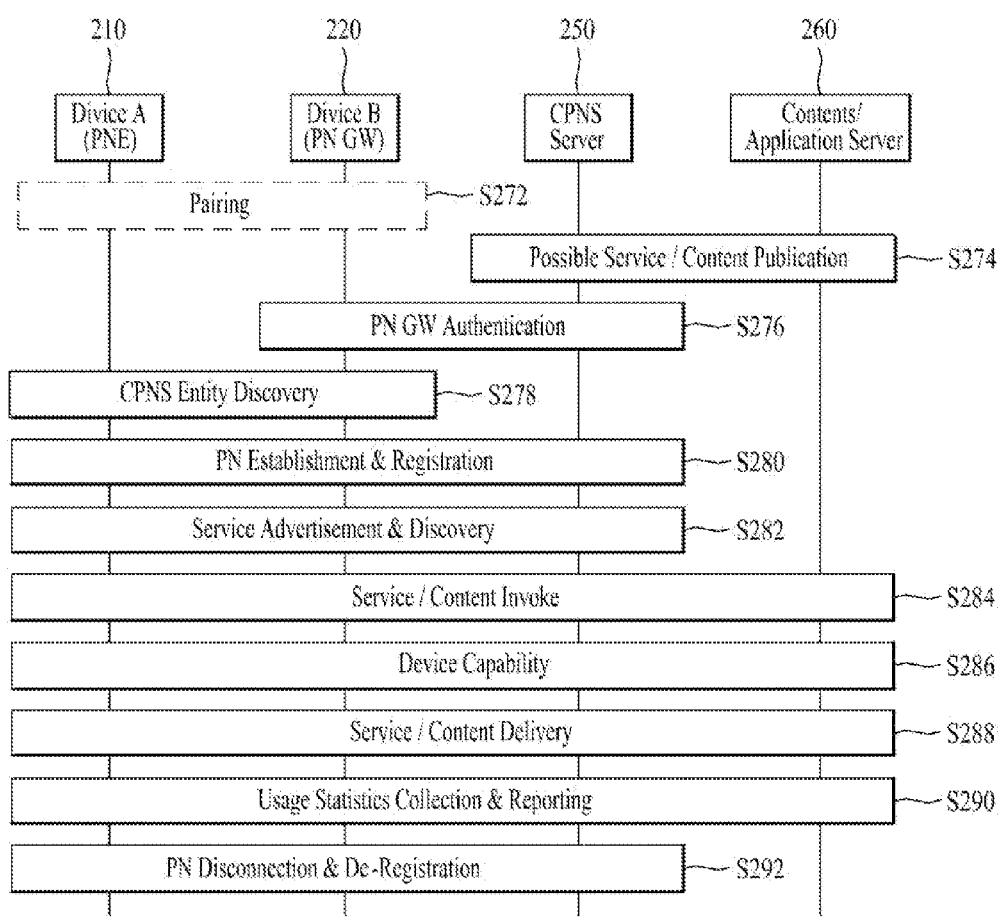
FIG. 2 illustrates a general procedure of CPNS functions for performing a CPNS service.

FIG. 2 illustrates a general procedure of CPNS functions for performing a CPNS service.

Referring to FIG. 2, a device A 210, a device B 220, a CPNS server 250, and a contents/application server 260 are illustrated. The device A 210 and the device B 220 may belong to a user. For example, the device A 210 may be a cellular phone of the user. The device B 220 may be a portable multimedia device of the user. The device A 210 and the device B 220 may communicate with each other via a network, for example, Bluetooth, Wi-Fi, and ZigBee. The device A 210 and the device B 220 may include a CPNS entity. Accordingly, the devices A and B 210 and 220 may operate in a PN GW mode or a PNE mode. For example, in FIG. 2, the device A 210 operates in a PNE mode and the device B 220 operates in a PN GW mode.

First, when the device A 210 and the device B 220 are close to each other, the device A 210 and the device B 220 may perform a physical connection or physical pairing procedure (S272). The contents/application server 260 may publish a service to the CPNS server 250 when a service and content are available (S274). The CPNS server 250 may perform an authentication procedure for authenticating the device B 220 that operates as a PN GW (S276). The authentication procedure (S276) may be performed before or after pairing between a PN GW and a PNE. When the physical connection procedure is completed, the device A 210 and the device B 220 may perform a CPNS entity discovery procedure in order to discover a CPNS entity (S278). Via the discovery, each CPNS device may know an operating mode (a PNE mode or a PN GW mode) of the CPNS device. When the discovery is completed, the devices A and B 210 and 220 may establish a PN (S280). Then the PNE 210 and the PN GW 220 may be connected to each other via the established PN. The PN GW 220 may produce information about a corresponding PN and transmit the information to the CPNS server 250, and the CPNS server 250 may store information about the PN in a PN inventory and register the information (S280). The CPNS server 250 may transmit the information about the PN to a related PN GW.

The PN establishment and registration are completed, the CPNS server 250 may advertise a service of the CPNS server 250 to a device (e.g., a PNE) in the PN or query a service that can be provided to the CPNS server 250 by the device (e.g., a PNE) in the PN (S282). The device (e.g., a PNE) in the PN may invoke a service or content based on a service provided by the CPNS server 250 (S284). When the service or the content is invoked, information about device capabilities of a device (e.g., a PNE) that consumes a service or content may be shared between the CPNS server 250 and/or the contents/application server 260 for delivery of the service and the content (S286). The device capabilities may be checked and the service or the content may be transmitted according to the checked device capabilities (S288). When an arbitrary device uses the service or the content, statistics about use of the service or content are collected and reported to the CPNS server 250 or the contents/application server 260 (S290). When the PN is not needed any more, the PN may be released and the information about the PN may also be de-registered in the CPNS server 250.

In FIG. 2, when a specific event occurs to determine that another device (e.g., the device A 210) needs to operate as the PN GW, for example, when a battery is running low in the device B 220 that operates as a PN GW, when a link state between the PN GW device and the CPNS server 250 is continuously poor, or when a user configures to switch the PN GW, devices in the PN may switch modes thereof.

Figure 3:
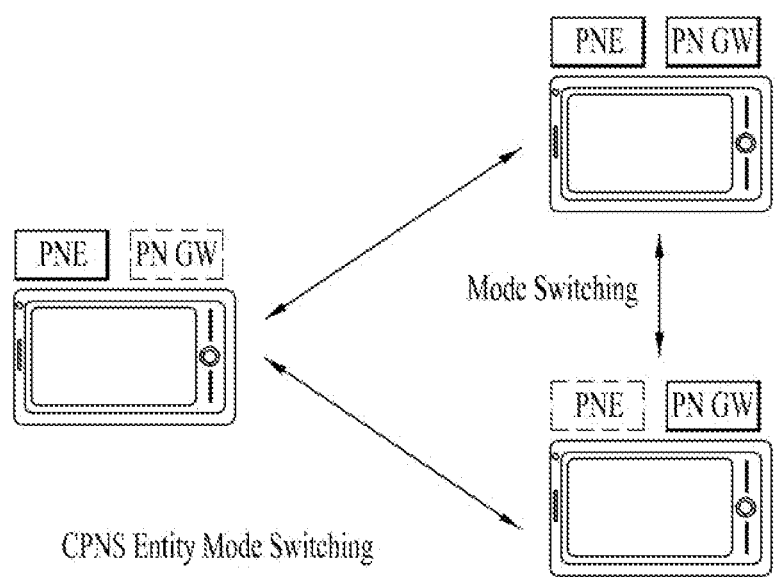
FIG. 3 illustrates mode switching of a CPNS device.

FIG. 3 illustrates mode switching of a CPNS device.

Referring to FIG. 3, the CPNS device may switch a mode thereof to a PNE mode, a PN GW mode, and a BOTH mode according to a specific situation. The CPNS device may enable or disable a PNE entity or PN GW entity thereof to switch the mode of the CPNS device. For example, the CPNS device that operates in the PN GW may enable the PNE entity to operate in the BOTH mode. In addition, for example, the CPNS device that operates in the PN GW mode may enable the PNE mode and disable the PN GW mode to switch the mode of the CPNS device to the PNE mode. Likewise, the CPNS device that operates in the PNE mode may enable the PN GW entity to switch the mode of the CPNS device to the PN GW mode or the BOTH mode.

For example, when a battery is running low in the PN GW device that operates in the PN GW mode and it is determined that another device needs to operate as a PN GW, or when a link state between the PN GW device and the CPNS server is continuously poor, the PN GW device may switch the mode thereof to the PNE mode from the PN GW mode. As another example, when a current PNE device can provide access to the CPNS server or external content server with a higher speed than a current PN GW device or when a CPNS server that ensures mobility for a user if a current PN GW device is a fixed device and a current device is a mobile device that can support the PN GW mode, the current device may switch a mode thereof to the PN GW mode from the PNE mode. As another example, when a CPNS device (e.g., an MP3 player, a smart meter, etc.) that supports only the PNE mode is present, the CPNS device operates only in the PNE mode. When the CPNS device supports only the PN GW mode, the CPNS device may operate as only a PN GW. When the CPNS device operates in any one of the PN GW mode and the PNE mode, the mode of the device may be executed according to a pre-stored value or switched according to user settings or provider settings.

In general, only one PN GW may be present in one PN. Thus when the CPNS device switches a mode thereof, the CPNS device needs to be authenticated by the CPNS server as well as by a PN GW in a PN to which the CPNS device belongs so as to prevent collision within the PN and collision with the CPNS server. In addition, upon switching the mode thereof, the CPNS device needs to update a PN inventory or SG inventory present in the CPNS server as well as a PN inventory or SG inventory of the CPNS device according to the switched mode and also needs to update a PN inventory or SG inventory present in other CPNS devices in the PN.

A mode in which each CPNS device operates in the PN may be recognized via the aforementioned entity discovery procedure. Alternatively, the CPNS device may use result information of the entity discovery that has been performed by the CPNS device, which is stored in a PN inventory, or information that is collected or shared via the entity discovery, etc. performed by another device in the PN. Accordingly, when the PNE device switches a mode thereof to the PN GW mode or the BOTH mode or requests the PN GW device to switch a mode of thereof to the PNE mode from the current PN GW mode or the BOTH mode, the PNE device may use operable mode information of devices, which is collected via the aforementioned procedures. In addition, when the PN GW device switches the mode thereof to the PNE mode and requests another device to switch a mode thereof to the PN GW mode or the BOTH mode, the PN GW device may also use operable mode information of devices, which is collected via the aforementioned procedures. With regard to the mode switching, mutual agreement between the PNE device and the PN GW device is needed and additionally, the switching may be completed in the presence of acceptance of the CPNS server.

The CPNS device that operates as a PNE switches a mode thereof to the PN GW mode or the BOTH mode via communication with the CPNS server and another device in the PN and switches a mode of another device that operates as a PN GW to the PNE mode to complete PN GW switching in the PN. Likewise, the CPNS device that operates as a PN GW may switch a mode thereof to the PNE mode via communication with the CPNS server and another device in the PN and switches a mode of another device that operates as a PNE to the PN GW mode or the BOTH mode to complete PN GW switching.

Figure 4:
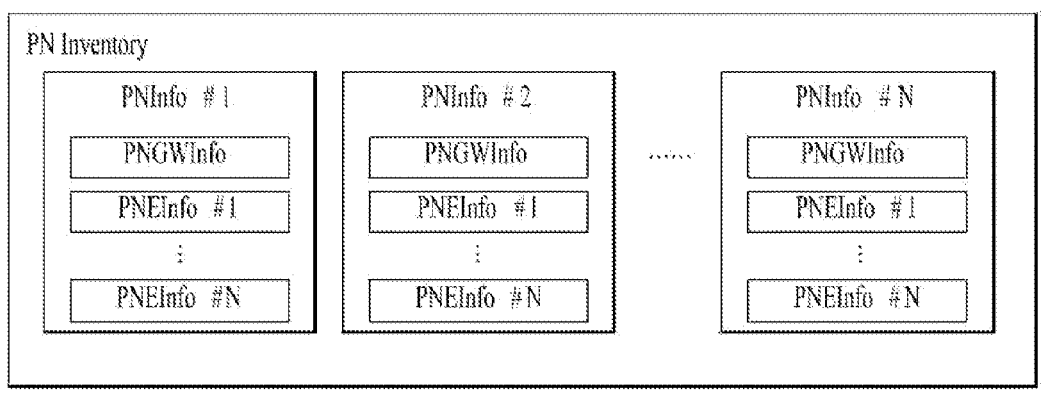
FIG. 4 illustrates an example of a personal network (PN) inventory to which the present invention is applicable.

FIG. 4 illustrates an example of a PN inventory to which the present invention is applicable.

Information about a PNE or PN GW entity (or device) that belongs to the PN may be managed using the PN inventory. That is, the PN inventory includes information about the PN. The PN inventory may be established or updated when the PN is established or changed. The PN inventory may be deleted when the PN is released. A CPNS server stores the PN information in a registered PN inventory. Upon receiving notification indicating that PN registration is successful from the CPNS server, a PN GW may store the PN information in the PN inventory. Upon receiving notification indicating that PN setup is successful from the PN GW, a PNE may store the PN information in the PN inventory. The PN inventory may be used when the CNPS entity manages the PN, when device capabilities need to be acknowledged, or when the PNE intends to know PN information of a remote PN of a CPNS user or PN information of another CPNS user via a service discovery. For example, the PN inventory may include information of Table 1 below. In Table 1, "E" refers to "element" and "A" refers to "attribute".

TABLE 1

| Element | Cardinality | T | Data Type | Description |
|---|---|---|---|---|
| PNInfo | 1 . . . n | E | | PN Information. Its sub attributes are PNID Description TempPN Active Sharing Disclosure OwnershipEntityID Its sub elements are PNGWInfo PNEInfo |
| PNID | 1 | A | String | PN Identification |
| Description | 0 . . . 1 | A | String | PN Description. |
| TempPN | 0 . . . 1 | A | Boolean | If this PN is temporary PN, this is "TRUE". If the physical connection between PNGW and all of PNEs is broken this PN should be released automatically. If this PN is sustained PN, this TempPN attribute is empty or "FALSE". |

TABLE 1-continued

| Element | Cardinality | T | Data Type | Description |
|---|---|---|---|---|
| Active | 1 | A | Boolean | The active status of PN.<br>TRUE - This PN is active because at least one more member PNEs are physically connected.<br>FALSE - This PN is not active because all of member PNEs are disconnected. |
| Sharing | 1 | A | Integer | The level of PN Inventory sharing in PNE side<br>1—Shared, both PNGWInfo and PNEInfo in PNInfo are shared in PNE<br>2—Protected, only PNGWInfo in PNInfo is shared in PNE. |
| Disclosure | 1 | A | Integer | The willingness of openness of PN Information, in case Service Discovery is requested after PN Setup<br>1—Blocked; PN information should not be unveiled.<br>2—Open; PN information will be unveiled, when other CPNS Entities asks service discovery.<br>3—Selective: PN can be unveiled, only when the authorized CPNS entity allows in case Service discovery request contains PNID, PNEID or UserID |
| OwnershipEntity ID | 0...1 | A | String | The ID of authorized CPNS Entity which has authorization to allow PN Information open, in case Service Discovery is requested. |
| PNGWInfo | 1 | E | | PN GW Information<br>Its sub attributes are<br>PNGWID<br>PNGWName<br>Mode<br>Zonebasedservicesupport<br>Broadcastgroupkeydeliverysupport<br>PNAdmin<br>Adminee |
| PNGWID | 1 | A | String | PN GW Identification. |
| PNGWName | 0...1 | A | String | PN GW Name (e.g. assigned nickname) |
| Mode | 1 | A | Integer | The mode of current device<br>2—PNGW, If the mode of device is PN GW, the value should be "PN GW".<br>3—BOTH, If the mode of device is both of PNE and PN GW, the value should be "BOTH" (e.g. mobile phone) |
| Zonebasedservice support | 0...1 | A | Boolean | If this CPNS entity is a capable PN GW of Zone Based Service. this value should be "TRUE". |
| Broadcastgroupkey deliverysupport | 0...1 | A | Boolean | TRUE PN GW supports broadcast Group Key delivery<br>FALSE: PN GW does not support broadcast Group Key delivery |
| PNAdmin | 0...1 | A | Boolean | If this PN GW is PN Admin in the PN, this value should be "TRUE" |
| Adminee | 0...1 | A | Boolean | If this PN GW is Adminee in the PN, this value should be "TRUE". |
| PNEInfo | 1...n | E | | PN E Information<br>Its sub attributes are<br>PNEID<br>PNEName<br>Active<br>Mode<br>PNAdmin<br>Adminee<br>Its sub elements are<br>UserInfo<br>DeviceCapa<br>ServiceProfile |
| PNEID | 1 | A | String | PNE Identification. |
| Name | 0...1 | A | String | PNE Name (e.g. mp3 player) |
| Active | 1 | A | Boolean | The active status of PNE.<br>TRUE - This PNE is active because PNE is physically connected.<br>FALSE - This PNE is not active because PNE is physically disconnected. |
| Mode | 1 | A | Integer | The mode of current device<br>1—PNE, If the mode of device IS PNE, the value should be "PNE".<br>3—BOTH, If the mode of device is both of PNE and PN GW, the value should be "BOTH" (e.g. mobile phone) |
| PNAdmin | 0...1 | A | Boolean | If this PNE is PN Admin in the PN, this value should be "TRUE" |
| Adminee | 0...1 | A | Boolean | If this PNE is Adminee in the PN, this value should be "TRUE". |
| UserInfo | 0...1 | E | — | Its attributes are<br>UserID<br>UserName |
| UserID | 1 | A | String | CPNS UserID |
| UserName | 0...1 | A | String | CPNS User Name |

TABLE 1-continued

| Element | Cardinality | T | Data Type | Description |
|---|---|---|---|---|
| DeviceCapa | 0 . . . 1 | E | | Capability information of device embedding PNE<br>Its sub attributes are<br>UICapa<br>Its sub element is<br>ExternalCapa |
| UICapa | 0 . . . 1 | A | Boolean | If this device doesn't support UI functionalities, this value SHALL be set with "TRUE".<br>TRUE: PN GW needs to support confirmation and/or Key assignment functionalities instead of PNE. |
| ExternalCapa | 0 . . . 1 | E | — | XML fragment contains information such as DeviceType, VideoCodec, etc. CPNS V1.0 can make use of the format of device capabilities from DPE Enabler specification. |
| ServiceProfile | 0 . . . 1 | E | | CPNS enabled application information to support certain service and status.<br>Its sub elements are<br>Service<br>ContentInfo |

There is a service group inventory having a similar concept to the PN inventory. The SG inventory includes information about service group(s). The SG inventory may be established or corrected when the service group is established or corrected. The SG inventory may be deleted when the service group is released. The CPNS server may store service group information of service groups registered for the CPNS server, in the SG inventory. The PN GW may store information about a service group to which PNE(s) of the same PN as that of the PN GW belongs in the SG inventory. The PNE may store information about a service group to which the PNE belongs in the SG inventory. For example, the SG inventory may include information of Table 2 below.

TABLE 2

| Element | Cardinality | T | Data Type | Description |
|---|---|---|---|---|
| SGInfo | 1 . . . n | E | | Service Group Information.<br>Its sub attributes are<br>SGID<br>SGDescription<br>Sharing<br>MaxPNE<br>MaxUser<br>SGOwner<br>CSGIndicator<br>Its sub elements are<br>ServiceID<br>MemberInfo |
| SGID | 1 | A | String | Service Group Identification. |
| SGDescription | 0 . . . 1 | A | String | Service Group description. This is human readable description and helpful to understand or search Service Group. |
| Sharing | 1 | A | Integer | The level of SG Inventory sharing<br>1—Open, every PNE can have access to SG Inventory<br>2—Selective, open to SG member PNEs only<br>3—Closed, no PNE will have access to SG Inventory. In this case only the SG owner can have access to the SG Inventory |
| MaxPNE | 0 . . . 1 | A | Integer | The maximum number of member PNE in Service Group. If this value is empty, it follows the policies of Operator and/or Service Provider. |
| MaxUser | 0 . . . 1 | A | Integer | The maximum number of user in Service Group. If this value is empty, it follows the policies of Operator and/or Service Provider. |
| SGOwner | 1 | A | String | Entity Identification of SGOwner. |
| CSGIndicator | 0 . . . 1 | A | Boolean | Indicator of Capabilities Sharing Group. If this attribute is "TRUE", this Service Group is a CSG, If this attribute is "FALSE" or skipped, this Service Group is not a CSG but just a SG |
| ServiceID | 0 . . . n | E | String | Service Identifications. |
| MemberInfo | 1 . . . n | E | | The Service Group member PNE Information.<br>Its sub attributes are<br>PNEID<br>PNGWID<br>Name<br>Its sub elements are<br>UserInfo<br>DeviceCapa<br>ServiceProfile<br>SharingCapa |

TABLE 2-continued

| Element | Cardinality | T | Data Type | Description |
|---|---|---|---|---|
| PNEID | 1 | A | String | PNE Identification. |
| PNGWID | 1 | A | String | PNGW Identification. The PN GW belongs to the same PN as PNE. |
| Name | 0 . . . 1 | A | String | PNE Name (e.g. mp3 player, assigned nickname) |
| UserInfo | 0 . . . 1 | E | — | User Information. Its attributes are UserID Name |
| UserID | 0 . . . 1 | A | String | User Identification |
| Name | 0 . . . 1 | A | String | User Name |
| DeviceCapa | 0 . . . 1 | E | | Capability information of device embedding PNE Its sub attribute is UIcapa Its sub element is ExternalCapa |
| UICapa | 0 . . . 1 | A | Boolean | If this device doesn't support UI functionalities, this value SHALL be set with "TRUE". TRUE: PN GW needs to support confirmation and/or Key assignment functionalities instead of PNE. |
| ExternalCapa | 0 . . . 1 | E | — | XML fragment contains information such as DeviceType, VideoCodec, etc. CPNS V1.0 can make use of the format of device capabilities from DPE Enabler specification. |
| ServiceProfile | 0 . . . 1 | E | | CPNS enabled application information to support certain service and status. Its sub-elements are Service ContentInfo |
| SharingCapa | 0 . . . 1 | E | | The capability(ies) will be shared (e.g., XML fragment device capabilities information). This element is set only if CSGIndicator is "TRUE". SharingCapa is a sub-set of DeviceCapa to indicate which kind of capabilities will be shared. SharingCapa element can be retrieved from DeviceCapa element. |

Figure 5:
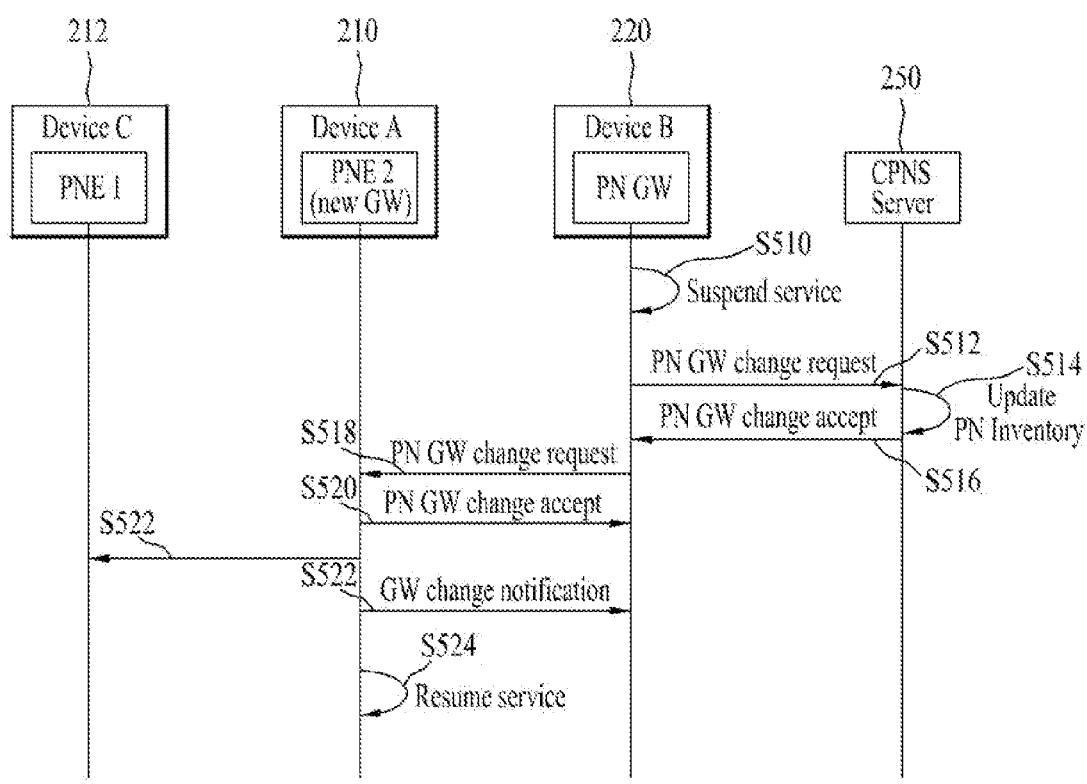
FIG. 5 illustrates an example of a method of personal network gateway (PN GW) switching according to conventional art.

FIG. 5 illustrates an example of a method 500 of PN GW switching.

Referring to FIG. 5, a device C 112 and the device A 210 operates as a PNE1 and a PNE2, respectively, and the device B 220 operates as a PN GW. The device B 220 suspends a service received from the CPNS server 250 in order to initiate PN GW switching when a specific event such as battery discharge occurs or when the device B 220 receives a request for gateway switching from a user (S510). After the service is suspended, the PN GW 220 transmits a PN GW change request message for request of PN GW switching to the CPNS server 250 (S512). The PN GW change request message may include operation mode information (e.g., attribute of entities in a device) of devices, which is changed via PN GW switching. For example, the PN GW change request message may include mode information (e.g., mode attribute) that requests to configure the device A 210 to operate as a PN GW and request of configuration the device B 220 to operate as a PNE. Upon receiving the PN GW change request message, the CPNS server 250 may update the PN inventory using the mode information contained in the PN GW change request message (S514). When the CPNS server 250 successfully updates the PN inventory, the CPNS server 250 may transmits a PN GW change accept message to the device B 220 (S516). After receiving the PN GW change accept message, the device B 220 transmits a PN GW change request message for requesting the device A 210 to switch a mode thereof to a PN GW mode and to operate, to the device A 210 that will operate as a new PN GW (S518). The device A 210 determines whether the device A 210 can operate as a PN GW, and when the device A 210 can operate as a PN GW, the device A 210 transmits a PN GW change accept message for acceptance of switching to a PN GW to the device B 220 (S520). Likewise, when both the CPNS server 250 and the device A 210 accept switching of a PN GW to the device A 210 from the device B 220, the device A 210 transmits a PN GW change notification message indicating that the PN GW is switched, to CPNS devices (e.g., the device B 220 and the device C 212) in the PN (S522). Then the device A 210 as a new PN GW resumes a service provided from the CPNS server 250 (S524).

In the method 500, when the device A 210 cannot operate as a PN GW (e.g., when the device A 210 does not have appropriate capabilities as a PN GW, for example, when battery capacity is insufficient), PN GW switching cannot be accepted. In this case, the PN inventory of the CPNS server 250 has been updated on information about PN GW switching and thus an appropriate procedure needs to be performed to restore the PN inventory of the CPNS server 250 to an original state. However, since a subject or method of the procedure is not defined, problems may arise when different procedures are differently defined for respective devices. In addition, when the PN inventory of the CPNS server 250 is not restored to an original state, problems may also arise in that a device (e.g., the device B 220) that originally operates as a PN GW cannot resume an operation of the PN GW. In addition, since the service has been already suspended (in S510), unnecessary service suspension cannot be prevented even if an existing PN GW resumes a service.

Figure 6:
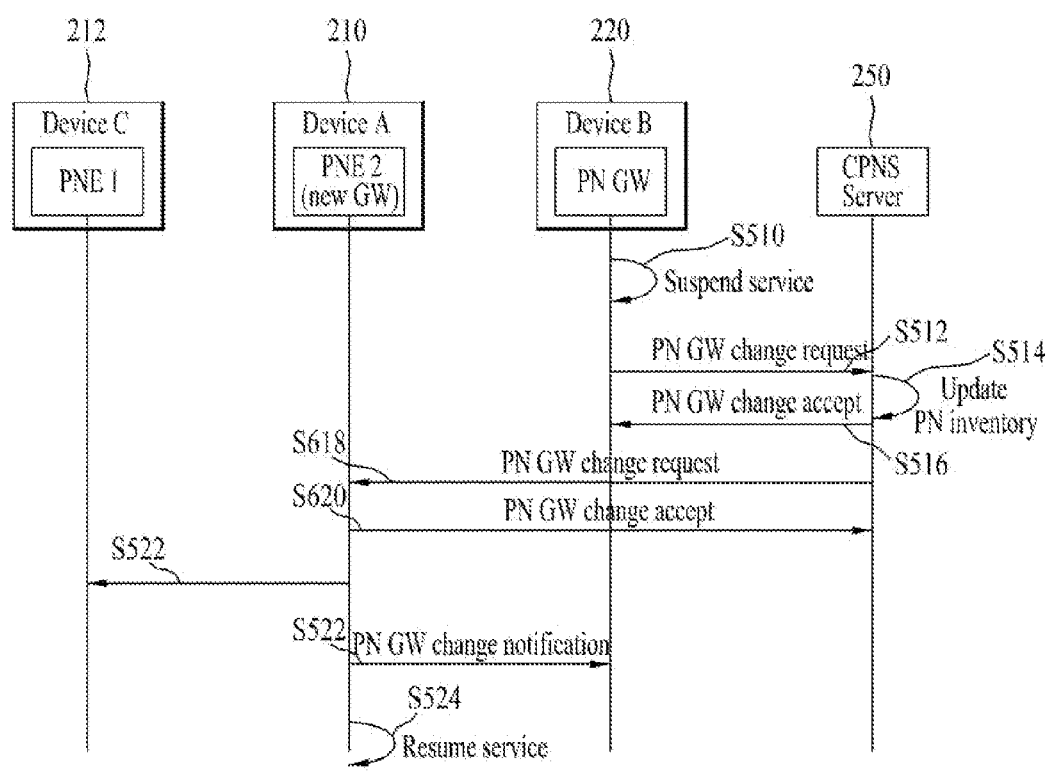
FIG. 6 illustrates another example of a method of PN GW switching according to conventional art.

FIG. 6 illustrates another example of a method 600 of PN GW switching.

Referring to FIG. 6, a device (e.g., the device B 220) that operates as a PN GW initiates PN GW switching, like in FIG. 5. Processes S510 to S516 are the same or similar to those of FIG. 5 and thus can also be understood with reference to FIG. 5.

The method 600 is different from the method 500 of FIG. 5 in that, after accepting a PN GW change request and updating a PN inventory of the CPNS server 250, the CPNS server 250 requests the device A 210 that will operate as a new PN GW to switch a PN GW. That is, the CPNS server 250 may transmit the PN GW change request message for request of switching of a mode to a PN GW mode, to the device A 210 that will operate as a new PN GW (S618). The device A 210 determines whether the device A 210 can operate as a PN GW, and when the device A 210 can operate as a PN GW, the device A 210 transmits a PN GW change accept message for acceptance of switching to a PN GW to the CPNS server 250 (S620). Likewise, when the device A 210 accepts to operate as a new PN GW, the device A 210 transmits a PN GW change notification message indicating that the PN GW is switched, to CPNS devices (e.g., the device B 220 and the device C 112) in the PN (S522). Then the device A 210 as a new PN GW resumes a service received from the CPNS server 250 (S524).

Upon rejecting the request for switching to a PN GW, the device A 210 transmits a message corresponding PN GW change request rejection to the CPNS server 250. Unlike in the method 500 of FIG. 5, in the method 600, since the CPNS server 250 receives the message corresponding to the change request rejection, the CPNS server 250 may restore changed information of the PN inventory. However, since the CPNS server 250 needs to restore the updated PN inventory and the device B 220 cannot know that the PN GW switching is rejected, the CPNS server 250 needs to retransmit a message indicating that the PN GW change request is rejected to the device B 220, thereby complicating procedures.

In the methods 500 and 600 of FIGS. 5 and 6, CPNS devices in a PN need to first communicate with the CPNS server 250 for PN GW switching. When the CPNS devices in the PN communicate with the CPNS server 250, the CPNS devices need to use a wide area network such as a cellular network, thereby causing delay, etc., which may be insufficient compared with the case of a local area network such as Wi-Fi or Bluetooth used in the PN.

In addition, in the methods 500 and 600 of FIGS. 5 and 6, when the PN GW change request is rejected, a service suspension period may be lengthened, and thus there is a need for a method for preventing unnecessary service suspension.

Accordingly, the present invention proposes a method for switching a PN GW via communication between a device that operates as a PN GW and a device that operates as a PNE in a current PN using device operation mode information. According to the method proposed by the specification, PN GW change request and response may be effectively transmitted and received between the PNE, the PN GW, and a CPNS server, a PN inventory and SG inventory of each entity may be effectively changed, and required information may be stably transmitted to a new PN GW from the CPNS server.

Figure 7:
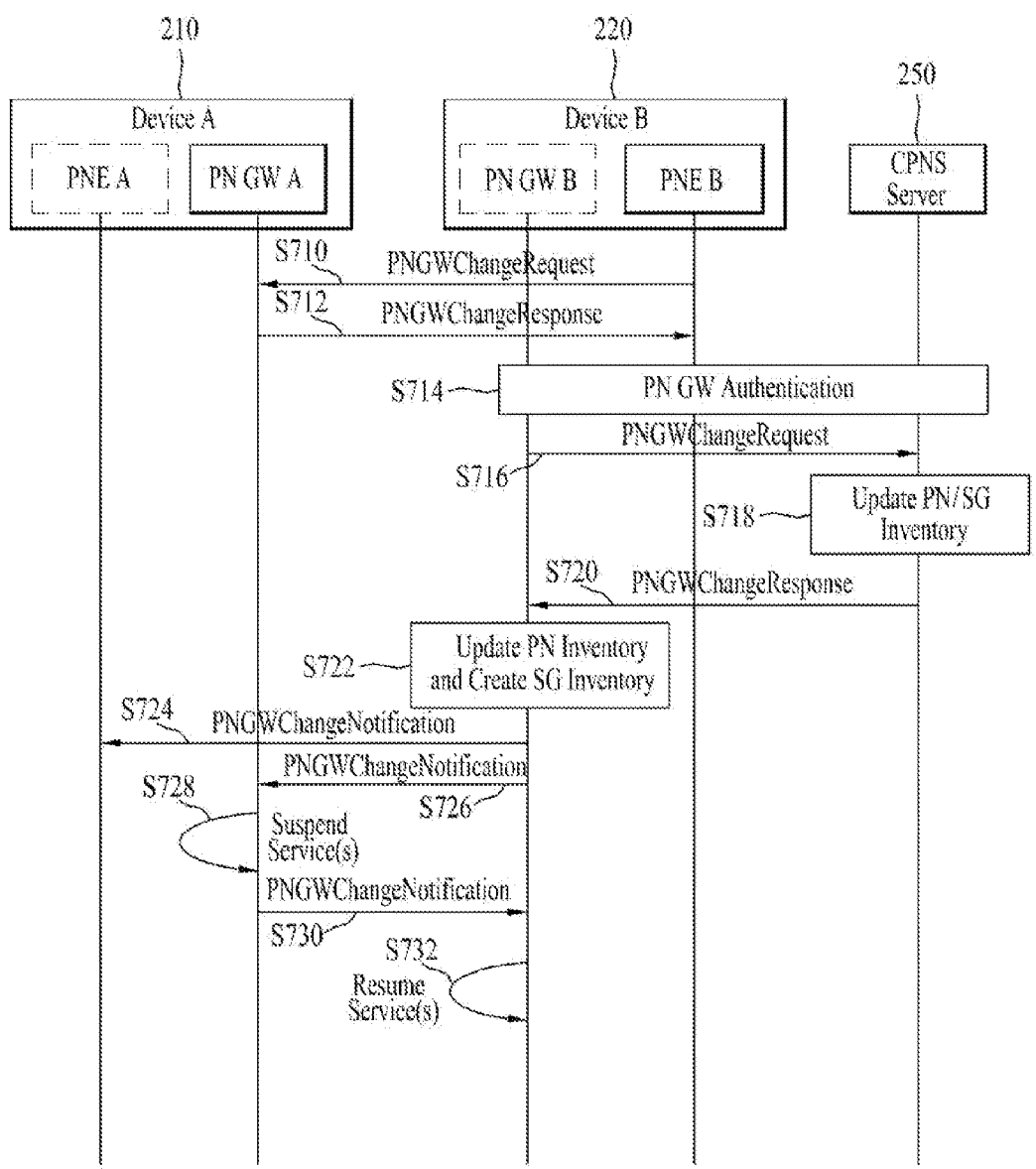
FIGS. 7 and 8 illustrate methods for switching a PN GW according to embodiments of the present invention.
Figure 8:
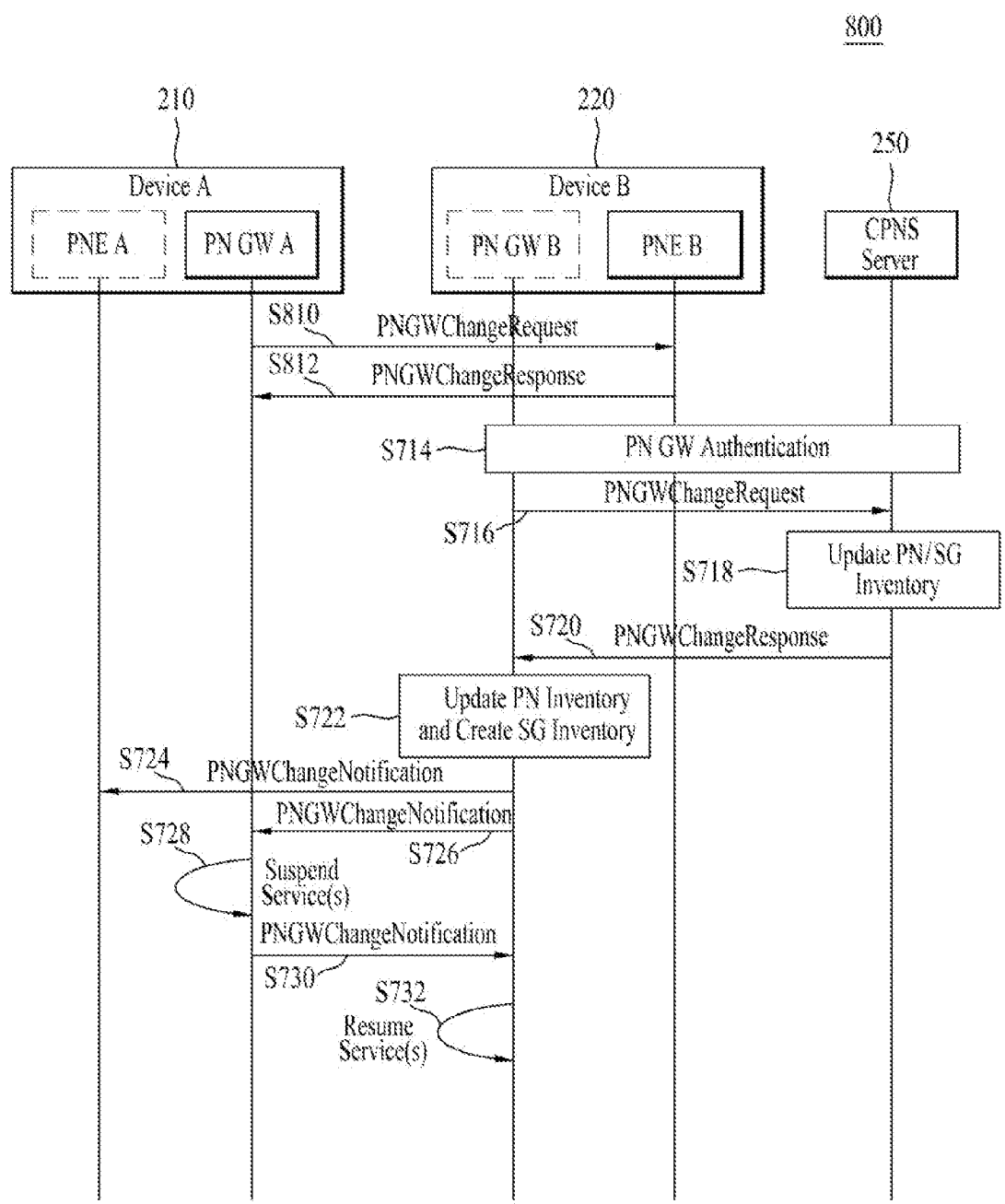

FIGS. 7 and 8 illustrate methods 700 and 800 for switching a PN GW according to embodiments of the present invention. Negotiation of request and response for PN GW switching may be performed between a device (e.g., the device A 210) that currently operates as a PN GW and a device (e.g., the device B 220) that currently operates as a PNE and can operate in a PN GW mode or a BOTH (PNE and PN GW) mode. That is, the request and response procedure for PN GW switching is pre-performed between devices in a PN prior to participation of a CPNS server (e.g., the CPNS server 250).

FIG. 7 illustrates the PN GW switching method 700 initiated by a PNE according to an embodiment of the present invention. In the method 700, PN GW switching may be initiated by a PNE (e.g., a PNE B) on a CPNS device (e.g., the device B 220) that can be switched to a PN GW.

Referring to FIG. 7, for example, the device A 210 and the device B 220 constitute one PN, the device A 210 operates as a PN GW, and the device B 220 operates as a PNE. The devices A and B 210 and 220 may each operate in at least mode of a PN GW mode, a PNE mode, and a BOTH mode. It is assumed that the CPNS devices 210 and 220 in the PN already know mode information of each CPNS device via an entity discovery procedure or with reference to information stored in a PN inventory prior to PN GW switching. In FIG. 7, the PN GW A of the device A 210 is an active PN GW of the corresponding PN and the PN GW B is a candidate PN GW to be switched.

First, a PNE (e.g., the PNE B) of a device (e.g., the device B 220) that can be switched to a PN GW may transmit a PN GW change request message (e.g., a PN GWChangeRequest message) to a current PN GW (e.g., the PN GW A) in order to initiate the PN GW switching procedure (S710). The PN GW change request message may include, for example, information of Table 3 below.

TABLE 3

| Element | Cardinality | T | Data Type | Description |
|---|---|---|---|---|
| PNGWChangeRequest | 1 | E | | Its sub elements are PNInfo |
| PNInfo | 1 | E | | PN Information Its sub attribute is PNID Its sub elements are PNGWInfo PNEInfo |
| PNID | 1 | A | String | PN Identification. |
| PNGWInfo | 1 | E | | If this message is transmitted between PN GW and PNE, this is information of currently active PN GW in the PN. Otherwise, between PN GW and CPNS Server, this is information of candidate PN GW. Its sub attributes are PNGWID PNGWName Mode Zonebasedservicesupport Broadcastgroupkeydeliverysupport |

TABLE 3-continued

| Element | Cardinality | T | Data Type | Description |
|---|---|---|---|---|
| PNGWID | 1 | A | String | PN GW Identification. |
| PNGWName | 0 . . . 1 | A | String | PN GW Name (e.g. assigned nickname) |
| Mode | 0 . . . 1 | A | Integer | If this message is transmitted between PN GW and PNE, this is the new Mode of CPNS Device which has currently active PN GW in the PN. Otherwise, between PN GW and CPNS Server, this is the Mode of CPNS Device which has candidate PN GW.<br>1—PNE, If the mode of device is PNE, the value should be "PNE"<br>2—PNGW, If the mode of device is PN GW, the value should be "PN GW".<br>3—BOTH, If the mode of device is both of PNE and PN GW, the value should be "BOTH" (e.g. mobile phone) |
| Zonebasedservice support | 0 . . . 1 | A | Boolean | If this CPNS entity is a capable PN GW of Zone Based Service, this value should be "TRUE". |
| Broadcastgroupkey deliverysupport | 0 . . . 1 | A | Boolean | TRUE: PN GW supports broadcast Group Key delivery<br>FALSE: PN GW does not support broadcast Group key delivery. |
| PNEInfo | 0 . . . 1 | E | | PNE Information. This element is included when this message is transmitted between PN GW and PNE.<br>Its sub attribute are<br>PNEID<br>Mode |
| PNEID | 1 | A | String | PNE Identification. |
| Mode | 1 | A | Integer | The Mode of CPNS Device which has the PNE having the above PNEID.<br>1—PNE, If the mode of device is PNE, the value should be "PNE".<br>2—PNGW, If the mode of device is PN GW, the value should be "PN GW"<br>3—BOTH, If the mode of device is both of PNE and PN GW, the value should be "BOTH" (e.g. mobile phone) |

For example, the PN GW change request message may include information (e.g., a PNInfo element) about the PN that will operate PN GW switching, information (e.g., a PNGWInfo element) about a PN GW, and information (e.g., a PNEInfo element) about a PNE. For example, the information about the PN may include ID information (e.g., PNID attribute) about the PN. For example, the information about the PN GW may include ID information (e.g., PNGWID attribute) indicating a current PN GW in a current PN and information (e.g., mode information) indicating a mode of a CPNS device including the PN GW after switching. For example, the information about the PNE may include information about ID (e.g., PNEID attribute) of the PNE and information (e.g., mode attribute) indicating a mode of a CPNS device including the PNE after switching.

The PNE (e.g., the PNE B) that initiates PN GW switching may request information about the PNE, contained in the PN GW change request message, and mode information to be changed in each of the devices 210 and 220 using information about a PN GW. For example, when a PN GW change request message (in S710) requests the device A 210 including the PN GW A that is a current PN GW to operate in a PNE mode after switching, for example, mode attribute of PNGWInfo element may be set to "1" indicating a PNE mode. As another example, when the PN GW change request message (in S710) requests the device B 220 including the PN GW B that is a candidate PN GW to operate in a PN GW mode after switching, for example, mode attribute of PNEInfo element may be set to "2" indicating a PN GW mode. As another example, in the PN GW change request message (in S710), when the device B 220 including the PN GW B that is a candidate PN GW is set to operate in a BOTH mode after switching, for example, mode attribute of PNEInfo element may be set to "3" indicating a PN GW mode. The set values are purely exemplary and different values or different types of data may be used for respective modes.

A current PN GW (e.g., the PN GW A) or device (e.g., the device A 210) that receives the PN GW change request message may determine whether the request is accepted and transmit a PN GW change response message to a PNE (e.g., the PNE B) that initiates PN GW switching in response to the PN GW change request message (S712). For example, the PN GW change response message may include information of Table 4 below.

TABLE 4

| Element | Cardinality | T | Data Type | Description |
|---|---|---|---|---|
| PNGWChangeResponse | 1 | E | | Its sub attribute is<br>Result<br>Its sub element is<br>PNInfo<br>ServiceInfo<br>SGInfo |
| Result | 1 | A | Integer | The status of success or fail.<br>1—Success<br>2—Fail |

TABLE 4-continued

| Element | Cardinality | T | Data Type | Description |
|---|---|---|---|---|
| PNInfo | 1 | E | | PN Information<br>Its sub attributes are<br>PNID<br>Its sub element is<br>PNEInfo |
| PNID | 1 | A | String | PN Identification. |
| PNEInfo | 0...n | E | | Information of PNE(s) in the PN.<br>Its sub attributes are<br>PNEID<br>PNEName<br>Active<br>Mode<br>PN Admin<br>Adminec<br>Its sub elements are<br>UserInfo<br>DeviceCapa<br>ServiceProfile |
| PNEID | 1 | A | String | PNE Identification. |
| Name | 0...1 | A | String | PNE Name (e.g. mp3 player) |
| Active | 1 | A | Boolean | The active status of PNE.<br>TRUE - This PNE is active because PNE is physically connected.<br>FALSE - This PNE is not active because PNE is physically disconnected. |
| Mode | 1 | A | Integer | The Mode of CPNS Device which has the PNE having the above PNEID.<br>1—PNE, If the mode of device is PNE, the value should be "PNE".<br>3—BOTH, If the mode of device is both of PNE and PN GW, the value should be "BOTH" (e.g. mobile phone) |
| PNAdmin | 0...1 | A | Boolean | If this PNE is PN Admin in the PN, this value should be "TRUE". |
| Adminee | 0...1 | A | Boolean | If this PNE is Adminee in the PN, this value should be "TRUE". |
| UserInfo | 0...1 | E | — | Its attributes are<br>UserID<br>UserName |
| UserID | 1 | A | String | CPNS UserID |
| UserName | 0...1 | A | String | CPNS User Name |
| DeviceCapa | 0...1 | E | | Capability information of device embedding PNE<br>Its sub attributes are<br>UICapa<br>Its sub element is<br>ExternalCapa |
| UICapa | 0...1 | A | Boolean | If this device doesn't support UI functionalities, this value SHALL be set with "TRUE".<br>TRUE: PN GW needs to support confirmation and/or Key assignment functionalities instead of PNE. |
| ExternalCapa | 0...1 | E | — | XML fragment contains information such as DeviceType. VideoCodec, etc CPNS V1.0 can make use of the format of device capabilities from DPE Enabler specification. |
| ServiceProfile | 0...1 | E | | CPNS enabled application information to support certain service and status<br>Its sub elements are<br>Service<br>ContentInfo |
| ServiceInfo | 0...n | E | | Information of Service(s) provided/consumed by PNE(s) in the PN without Service Group.<br>Its sub attributes are<br>ServiceID<br>PNEID<br>Its sub element is<br>Operation |
| ServiceID | 1 | A | String | Service identification |
| PNEID | 1 | A | String | Identification of PNE providing/consuming the Service |
| Operation | 1...n | E | | Its sub attribute is<br>Name<br>Its sub elements are<br>InputParameterList<br>OutputParameterList |
| Name | 1 | A | String | User-friendly representation of service (e.g., application specific operation name) |
| InputParameterList | 0...1 | E | | The input parameter (argument) for the service<br>Its sub-elements are<br>Parameter |

TABLE 4-continued

| Element | Cardinality | T | Data Type | Description |
|---|---|---|---|---|
| OutputParameterList | 0 . . . 1 | E | | The output parameter (returned parameter) for the service<br>Its sub-elements are<br>Parameter |
| SGInfo | 0 . . . n | E | | Information of Service Group which PNE(s) in the PN belonging to.<br>Its sub attributes are<br>SGID<br>SGDescription<br>SGOwner<br>Its sub elements are<br>ServiceInfo<br>MemberInfo |
| SGID | 1 | A | String | Service Group Identifier. |
| SGDescription | 0 . . . 1 | A | String | Service Group description. This is human readable description and helpful to understand or search Service Group. |
| SGOwner | 0 . . . 1 | A | String | Entity Identification of SGOwner |
| ServiceInfo | 0 . . . n | E | | Service Information for this Service Group.<br>Its sub attributes are<br>ServiceID<br>ServiceStatus |
| ServiceID | 1 | A | String | Service Identification. |
| ServiceStatus | 0 . . . 1 | A | Integer | The status of the Service.<br>0—Current, this Service is available for this Service Group.<br>1—New, this Service is added.<br>2—Deleted, this Service is deleted. |
| MemberInfo | 0 . . . n | E | String | The Service Group member information.<br>Its sub attributes are<br>PNEID<br>PNGWID<br>Name<br>Status<br>Its sub elements are<br>UserInfo<br>DeviceCapa<br>ServiceProfile |
| PNEID | 1 | A | String | PNE Identification. |
| PNGWID | 0 . . . 1 | A | String | PN GW Identification |
| Name | 0 . . . 1 | A | String | PNE Name (e.g. MP3 player, assigned nickname) |
| Status | 1 | A | Integer | The status of the PNE.<br>0—Current, this PNE is member of SG<br>1—Invited, this PNE was invited.<br>2—Expelled, this PNE was expelled.<br>3—Joined, this PNE has joined.<br>4—Left, this PNE has left. |
| UserInfo | 0 . . . 1 | E | — | User Information.<br>Its attributes are<br>UserID<br>Name |
| UserID | 0 . . . 1 | A | String | UserIDentification |
| Name | 0 . . . 1 | A | String | User Name |
| DeviceCapa | 0 . . . 1 | E | | Capability information of device embedding PNE<br>Its sub attribute is<br>UICapa<br>Its sub element is<br>ExternalCapa |
| UICapa | 0 . . . 1 | A | Boolean | If this device doesn't support UI functionalities below, this value SHALL be set with "TRUE".<br>TRUE: PN GW needs to support confirmation and/or Key assignment functionalities instead of PNE. |
| ExternalCapa | 0 . . . 1 | E | — | XML fragment contains information such as DeviceType, VideoCodec, etc. CPNS V1.0 can make use of the format of device capabilities from DPE Enabler specification. |
| ServiceProfile | 0 . . . 1 | E | | CPNS enabled application information to support certain service and status. Its sub-elements are<br>StatusVariable<br>ServiceList |

For example, the PN GW change response message may include information (e.g., Result attribute) about a determination result of whether the request is accepted. For example, when the PN GW A accepts the change request, the Result attribute of the PN GW change response message transmitted to the PNE B may be set to "1" indicating success. As another example, when the PN GW A rejects the change request, the Result attribute of the PN GW change response message transmitted to the PNE B may be set to "2" indicating failure. The set values are purely exemplary and different values or different types of data such as a Boolean value may be used.

When the PNE (e.g., the PNE B) that initiates PN GW switching receives the PN GW change response message indicating success, the device (e.g., the device B 220) including the corresponding PNE may switch a mode of the device to a PN GW mode or a BOTH mode according to the request of the PN GW change request message (in S710). In this case, the candidate PN GW (e.g., the PN GW B) may perform a PN GW authentication procedure with a CPNS server (S714). For example, the device B 220 may enable the PN GW B to switch a mode of the device B 220 to a PN GW mode or a BOTH mode. Whether the device B 220 is switched to a PN GW mode or a BOTH mode may be determined according to a mode value set in the PN GW change request message when the device B 220 initiates PN GW switching. For example, when the PNE that initiates PN GW switching is configured to be switched to a BOTH mode while initiating PN GW switching, the device B 220 may switch a mode thereof to the BOTH mode. As another example, when a PNE that initiates PN GW switching requests to switch a mode of the PNE to a PN GW mode while initiating PN GW switching, the device B 220 may disable the PNE mode and switch the mode of the device B 220 to the PN GW mode. As another example, when the device B 220 is switched to the PN GW mode, the switching may be performed prior to resuming (S732) a service of disabling the PNE mode. Then the enabled PN GW B on the device B 220 may perform PN GW authentication with the CPNS server 250. Via the authentication procedure, secure connection between a candidate PN GW and the CPNS server may be ensured.

In addition, the PN GW (e.g., the PN GW B) may receive information about a current PN, such as PN ID information, etc. from the PNE (e.g., the PNE B) via internal procedure call or a CPNS message. The received information about the PN may be used to transmit a request the candidate PN GW to operate as a PN GW, to the CPNS server 250.

The candidate PN GW may transmit the PN GW change request message (e.g., the PN GWChangeRequest message) for requesting a current PN to operate a new PN GW to the CPNS server 250 via mode switching the corresponding devices 210 and 220 after PN GW authentication (S716). For example, the PN GW change request message transmitted to the CPNS server 250 from the candidate PN GW (e.g., the PN GW B) may include information of Table 3. For example, the PN GW change request message may include information (e.g., PNInfo element) about a PN and information (e.g., PNGWInfo element) about the candidate PN GW. For example, the information about the PN may include PN ID information (e.g., PNID attribute). For example, the information about the candidate PN GW may include ID information (e.g., PNGWID attribute) of the candidate PN GW, and selectively, include name information (e.g., PNGWName attribute) of the candidate PN GW, mode information (e.g., Mode attribute), information (e.g., Zonebasedserveicesupport attribute) about whether a zone based service is supported, and information (e.g., Broadcastgroupkeydeliverysupport attribute) about whether group key broadcast delivery is supported. In this case, information of the PN ID information, etc. may be acquired, for example, via the PNE B of the device B 220.

In operation S716, upon receiving a PN GW change request message, the CPNS server 250 determines whether the PN GW change request is accepted. When the change request is accepted, the CPNS server 250 may update a PN inventory and SG inventory thereof (S718). For example, the CPNS server 250 may update information about a PN GW among information about the corresponding PN of the PN inventory of the CPNS server 250 using information (e.g., PNGWInfo element) of the PN GW, contained in the PN GW change request message. For example, the CPNS server 250 may update PN GW information of the corresponding SG using information (e.g., PNGWID attribute) bout the PN GW, contained in the PN GW change request message.

The CPNS server 250 may update the PN inventory and SG inventory thereof and then transmit the PN GW change response message (e.g., the PNGWChangeResponse message) to the candidate PN GW (e.g., the PN GW B) (S720). In this case, the transmitted PN GW change response message may include, for example, information of Table 4. For example, the PN GW change response message may include information (e.g., Result attribute) indicating whether the PN GW change request is accepted. For example, when the CPNS server 250 accepts the change request from the candidate PN GW, the information (e.g., Result attribute) indicating whether the change request is accepted may be set to "1" indicating success. The set values are purely exemplary and different values or different types of data may be used. In addition, the PN GW change response message may include, for example, information (e.g., PNInfo element), about a PN, information (e.g., all lower elements/attributes) about PNE(s) that are currently subscribed to the PN, information (e.g., all lower elements/attributes of ServiceInfo element) about a CPNS service used by PNE(s), and information (e.g., all lower elements/attributes of SGInfo element) about a SG to which PNE(s) subscribe. For example, the information about the PN may include PN ID information (e.g., PNID attribute) for identifying a current PN. These pieces of information are transmitted from the CPNS server 250 rather than being transmitted to the candidate PN GW (e.g., the PN GW B) from the current PN GW (e.g., the PN GW A) because secure connection is generated via the PN GW authentication procedure between the PN GW and the CPNS server to ensure secure communication. Accordingly, information such as a group key, etc. may also be transmitted from the CPNS server 250. In order to receive these pieces of information from the current PN GW instead of from the CPNS server 250, an additional mutual authentication procedure between the current PN GW and the candidate PN GW may be needed. In addition, communication technology used for communication with a CPNS server such as a cellular network has higher security than communication technology used in a PN, and thus it may be more advantageous to receive information from the CPNS server.

When the CPNS server 250 does not accept the change request from the candidate PN GW, information (e.g., Result attribute) indicating whether the change request is accepted may be set to "2" indicating failure. The set value may not be limited thereto and other values and data type may be used. When the change request is not accepted, the candidate PN GW may transmit a message indicating the non-acceptance to an entity (a PNE or a PN GW) that initiates the PN GW switching procedure. When the candidate PN GW and the entity that initiates the PN GW switching procedure are present in the same device, information indicating that the PN GW change request is not accepted by the CPNS server may be indicated via internal procedure call or a CPNS message. When the candidate PN GW and the entity that initiates the PN GW switching procedure are present in different devices, information indicating that the PN GW change request is not accepted by the CPNS server may be indicated via a CPNS message. In addition, the non-acceptance may be indicated via other various methods. When a predetermine condition is satisfied, an entity that receives information indicating the CPNS server does not accept the PN GW switching procedure may resume the PN GW switching procedure. The predetermined condition may include a condition in which a predetermined period of time elapses and whether the predetermined time is satisfied may be checked using a timer. When the PN GW switching procedure is resumed, a target PN GW may be switched.

Although not illustrated in FIG. 7, when there is a SG member that belongs to another PN that is not the corresponding PN among SG members updated according to PN GW switching, the CPNS server 250 may transmit an SG changing notification message (e.g., SGChangeNotification message) to the PN GW of another PN. For example, the SG changing notification message may include information of Table 5 below.

TABLE 5

| Element | Cardinality | T | Data Type | Description |
|---|---|---|---|---|
| SGChangeNotification | 1 | E | | Its sub element is SGInfo |
| SGInfo | 1 | E | | Service Group Information. Its sub attributes are SGID SGDescription SGOwner Its sub elements are ServiceInfo MemberInfo |
| SGID | 1 | A | String | Service Group Identifier. |
| SGDescription | 0 ... 1 | A | String | Service Group description. This is human readable description and helpful to understand or search Service Group. |
| SGOwner | 0 ... 1 | A | String | Entity Identification of SGOwner |
| ServiceInfo | 0 ... n | E | | Service Information for his Service Group. Its sub attributes are ServiceID ServiceStatus |
| ServiceID | 1 | A | String | Service Identification. |
| ServiceStatus | 0 ... 1 | A | Integer | The status of the Service. 0—Current, this Service is available for this Service Group 1—New, this Service is added. 2—Deleted, this Service is deleted. |
| MemberInfo | 0 ... n | E | String | The Service Group member information. Its sub attributes are PNEID PNGWID Name Status Its sub elements are UserInfo DeviceCapa ServiceProfile |
| PNEID | 1 | A | String | PNE Identification. |
| PNGWID | 0 ... 1 | A | String | PN GW Identification |
| Name | 0 ... 1 | A | String | PNE Name (e.g. MP3 player, assigned nickname) |
| Status | 1 | A | Integer | The status of the PNE. 0—Current, this PNE is member of SG 1—Invited, this PNE was invited. 2—Expelled, this PNE was expelled. 3—Joined, this PNE has joined. 4—Left, this PNE has left. |
| UserInfo | 0 ... 1 | E | — | User Information. Its attributes are UserID Name |
| UserID | 0 ... 1 | A | String | User Identification |
| Name | 0 ... 1 | A | String | User Name |
| DeviceCapa | 0 ... 1 | E | | Capability information of device embedding PNE Its sub attribute is UICapa Its sub element is ExternalCapa |
| UICapa | 0 ... 1 | A | Boolean | If this device doesn't support UI functionalities below, this value SHALL be set with "TRUE". TRUE: PN GW needs to support confirmation and/or Key assignment functionalities instead of PNE. |
| ExternalCapa | 0 ... 1 | E | — | XML fragment contains information such as DeviceType, VideoCodec, etc. CPNS V1.0 can make use of the format of device capabilities from DPE Enabler specification. |
| ServiceProfile | 0 ... 1 | E | | CPNS enabled application information to support certain service and status. Its sub-elements are StatusVariable ServiceList |

Upon a PN GW change response message from the CPNS server 250 (S720), the candidate PN GW (e.g., the PN GW B) may update a PN inventory thereof to generate a SG inventory (S722). For example, the candidate PN GW may update the PN inventory thereof using information (e.g., PNEInfo element) about a PNE, contained in the PN GW change response message. For example, when information (e.g., SGInfo element) about the SG is contained in the PN GW change response message, the candidate PN GW may generate the SG inventory and store the received SG information. In addition, the candidate PN GW may internally store information (e.g., ServiceInfo element) about a CPNS service. The information about the CPNS service may be associated with a service that is used by a PNE that does not subscribe to the SG.

At this point of time, the candidate PN GW (e.g., the PN GW B) receives the PN GW change response message for acknowledgement of PN GW switching from the CPNS server 250 as well as from the current PN GW (e.g., the PN GW A) (S712 and S720) and thus may transmit the PN GW change notification message (e.g., PN GWChangeNotification message) indicating the reception to all PNEs in the PN (S724). In this case, the transmitted PN GW change notification message may include, for example, information of Table 6 below.

GW, mode information (e.g., Mode attribute), information (e.g., Zonebasedserveicesupport attribute) about whether a zone based service is supported, and information (e.g., Broadcastgroupkeydeliverysupport attribute) about whether group key broadcast delivery is supported.

In operation S724, a PNE (e.g., the PNE A) that receives the PN GW change notification message from the candidate PN GW (e.g., the PN GW B) may update a PN inventory and SG inventory of the PNE using information (e.g., PNGWInfo element) of a PN GW contained in the message.

The candidate PN GW (e.g., the PN GW B) may transmit the PN GW change notification message to PNEs in the PN and then transmit the PN GW change notification message to the current PN GW (e.g., the PN GW A) (S726). The PN GW change notification message may include information about the PN and information about the candidate PN GW like in operation S724. For example, the PN GW change notification message (in S726) may include ID information (e.g., PNID attribute) of the corresponding PN and ID information (e.g., PNGWID attribute) of the candidate PN GW.

The current PN GW (e.g., the PN GW A) may receive the PN GW change notification message from the candidate PN GW (e.g., the PN GW B) (S726) and then suspend a currently executed service (S728). For example, the current

TABLE 6

| Element | Cardinality | T | Data Type | Description |
|---|---|---|---|---|
| PNGWChangeNotification | 1 | E | | Its sub element is PNInfo Its sub attribute is SuspensionCompletion |
| PNInfo | 1 | E | | PN Information Its sub attribute is PNID Its sub element is PNGWInfo |
| PNID | 1 | A | String | PN Identification. |
| PNGWInfo | 1 | E | | Information of candidate PN GW Its sub attributes are PNGWID PNGWName Mode Zonebasedservicesupport Broadcastgroupkeydeliverysupport |
| PNGWID | 1 | A | String | PN GW Identification. |
| PNGWName | 0 . . . 1 | A | String | PN GW Name (e.g. assigned nickname) |
| Mode | 0 . . . 1 | A | Integer | The Mode of CPNS Device which has the PN GW having the above PNGWID 2—PNGW, If the mode of device is PN GW, the value should be "PN GW". 3—BOTH, If the mode of device is both of PNE and PN GW, the value should be "BOTH" (e.g. mobile phone) |
| Zonebasedservice support | 0 . . . 1 | A | Boolean | If this CPNS entity is a capable PN GW of Zone Based Service, this value should be "TRUE". |
| Broadcastgroupkey deliverysupport | 0 . . . 1 | A | Boolean | TRUE: PN GW supports broadcast Group Key delivery FALSE: PN GW does not support broadcast Group Key delivery. |
| SuspensionCompletion | 0 . . . 1 | A | Boolean | This attribute is included and set as "TRUE" when currently active PN GW sends this notification to candidate PN GW to notify Service(s) suspension. |

For example, the PN GW change notification message may include information (e.g., PNInfo element) about the PN and information (e.g., PNGWInfo element) about the candidate PN GW. For example, the information about the PN may include ID information (e.g., PNID attribute) about the PN의 ID. In addition, the information about the candidate PN GW may include ID (e.g., PNGWID attribute) of the candidate PN GW and selectively include name information (e.g., PNGWName attribute) of the candidate PN PN GW may transmit a service suspension request message (e.g., an InvokeRequest message) for suspension of the service to the CPNS server 250.

When the service suspension is completed, the current PN GW (e.g., the PN GW A) may transmit the PN GW change notification message to the candidate PN GW (e.g., the PN GW B) in order to inform the candidate PN GW of the service suspension (S730). For example, the PN GW change notification message (in S730) may include ID information (e.g., PNID attribute) of the corresponding PN and information (e.g., SuspensionCompletion attribute) indicating the service suspension. For example, the SuspensionCompletion attribute may be set to "TRUE" since the service suspension is completed. However, in another example, the SuspensionCompletion attribute may be set to, for example, an integer such as "0" or "1" instead of Boolean value. A device (e.g., the device A 210) that currently operates as a PN GW may transmit the PN GW change notification message (S730) and then switch a mode of the device. For example, the device A 210 may switch the mode thereof to a PNE mode from a PN GW mode.

The candidate PN GW (e.g., the PN GW B) may receive the PN GW change notification message (S730), and then resume the suspended service using SG information and information that are previously received from the CPNS server 250 when information (e.g., SuspensionCompletion attribute) indicating that the service suspension is completed is set to "TRUE" (S732). For example, the PN GW B may transmit the service resume request message (e.g., the InvokeRequest message) for resuming the service to the CPNS server 250.

Information about service(s) that is suspended and resumed in operations S728 and S732 may be transmitted via the PN GW change response message (in S720) that is transmitted to the candidate PN GW (e.g., the PN GW B) from the CPNS server 250. For example, the information about the suspended and resumed service(s) may be transmitted through ServiceInfo element(s) of the PN GW change response message (in S720).

FIG. 8 illustrates the PN GW switching method (800) initiated by a PN GW. In the method (800), the PN GW switching may be initiated by the PN GW (e.g., the PN GW A) on the CPNS device (e.g., the device A 210) that currently operates as a PN GW.

Referring to FIG. 8, the device A 210 and the device B 220 constitute one PN, the device A 210 operates as a PN GW, and the device B 220 operates as a PNE. The devices A and B 210 and 220 may each operate in at least mode of a PN GW mode, a PNE mode, and a BOTH mode. It is assumed that the CPNS devices 210 and 220 in the PN already know mode information of each CPNS device via an entity discovery procedure or with reference to information stored in a PN inventory prior to PN GW switching. In FIG. 8, the PN GW A of the device A 210 is an active PN GW of the corresponding PN and the PN GW B is a candidate PN GW to be switched.

The method 800 of FIG. 8 is different from the method 700 of FIG. 7 in terms of a subject of PN GW switching in a PN. Thus directions of a PN GW change request message and a PN GW change response message that are transmitted and received for switching in the PN are different. The remaining operations are similar to the same as in the method 700 of FIG. 7 and will also be understood with reference to FIG. 7.

First, in order to initiate the PN GW switching procedure, the current PN GW (e.g., the PN GW A) may transmit a PN GW change request message (e.g., the PN GWChangeRequest message) to a PNE (e.g., the PNE B) of a device (e.g., the device B 220) that can be switched to a PN GW (S810).

The PN GW change request message may include, for example, information of Table 3. For example, the PN GW change request message may information (e.g., PNInfo element) about a target PN of PN GW switching, information (e.g., PNGWInfo element) about the PN GW, and information (e.g., PNEInfo element) about the PNE. For example, the information about the PN may include ID information (e.g., PNID attribute) about the PN. For example, the information about the PN GW may ID information (e.g., PNGWID attribute) indicating a current PN GW in the PN and mode information (e.g., Mode attribute) indicating a mode of a CPNS device including the PN GW after switching. For example, the information about the PNE may include ID (e.g., PNEID attribute) of a PNE and mode information (e.g., Mode attribute) indicating a mode of the CPNS device including the PNE after switching.

A PN GW (e.g., the PN GW A) that initiates PN GW switching may request mode information to be switched in the devices 210 and 110 using information about the PNE and information about the PN GW, contained in the PN GW change request message. For example, when the PN GW change request message (in S810) requests the device A 210 including the PN GW A that is a current PN GW to operate in a PNE mode after switching, the Mode attribute of PNGWInfo element may be set to "1" indicating a PNE mode. As another example, when the PN GW change request message (in S810) requests the device A 210 including the PN GW B that is the candidate PN GW to operate in a PN GW mode after switching, the Mode attribute of PNEInfo element may be set to "2" indicating a PN GW mode. As another example, when the PN GW change request message (in S810) requests the device A 210 including the PN GW B as the candidate PN GW to operate in a BOTH after switching, the Mode attribute of PNEInfo element may be set to "3" indicating a PN GW mode. The set values are purely exemplary and different values or different types of data such as a Boolean value may be used for respective modes.

The PNE (e.g., the PNE B) or device (e.g., the device B 220) that receives the PN GW change request message may determine whether the request is accepted and transmit the PN GW change response message to the current PN GW (e.g., the PN GW A) in response to the PN GW change request message (S812). For example, the PN GW change response message may include information of Table 4. For example, the PN GW change response message may include information (e.g., Result attribute) about determination result of whether the request is accepted. For example, when the PN GW A accepts the change request, the Result attribute of the PN GW change response message transmitted to the PNE B may be set to "1" indicating success. When the PN GW A rejects the change request, the Result attribute of the PN GW change response message transmitted to the PNE B may be set to "2" indicating failure. The set values are purely exemplary and different values or different types of data such as a Boolean value may be used.

When the PNE (e.g., the PNE B) accepts the change request, a device (e.g., the device B 220) including the corresponding PNE may switch a mode of the device to a mode indicated by the PN GW change request message and the candidate PN GW (e.g., the PN GW B) may perform a PN GW authentication procedure with the CPNS server (S714). Whether the device B 220 is switched to a PN GW mode or a BOTH mode may be determined according to a mode value set in the PN GW change request message when the device B 220 initiates PN GW switching. For example, when the PNE that initiates PN GW switching is configured to be switched to a BOTH mode while initiating PN GW switching, the device B 220 may switch a mode thereof to the BOTH mode. As another example, when a PNE that initiates PN GW switching requests to switch a mode of the PNE to a PN GW mode while initiating PN GW switching, the device B 220 may disable the PNE mode and switch the mode of the device B 220 to the PN GW mode. Then the enabled PN GW B on the device B 220 may perform PN GW authentication with the CPNS server 250.

Hereinafter, operations S714 to S732 may be similar to the same as in the method of FIG. 7 and will also be understood with reference to the description of the method 700 of FIG. 7.

In the method 700 of FIG. 7 and the method 800 of FIG. 8, a current PN GW and PNE in one PN participate in a request and response procedure for PN GW switching, which is performed prior to participation of a CPNS server. Accordingly, negotiation between entities (or devices including the entities) constituting one PN is previously performed for PN GW switching, thereby preventing this procedure from being canceled prior to completion of PN GW switching and preventing change in a PN inventory, etc. from being restored. In this case, since a PN in which a CPNS is provided is a network including devices (entities) owned by a user, when the PN GW can successfully complete PN GW authentication through the CPNS server, the CPNS server does not reject a change request of a new PN GW in general.

In the method 700 of FIG. 7 and the method 800 of FIG. 8, when the PN GW change request message is received (S710 and S810) and the change request is rejected, an overall PN GW switching procedure is completed, thereby preventing unnecessary service suspension and delay of suspended periods.

In addition, as described above, the candidate PN GW may perform PN GW authentication with the CPNS server and receive information about a PN through a more secure network than a network used in the PN, thereby maintaining higher security.

The above-described embodiments may be combined with each other, and thus, may be used alone or in combination thereof, if necessary. The combination may be easily implemented by one of ordinary skill in the art, and thus, a detailed description thereof will not be given here. Although not described, it is to be appreciated that the combination is not precluded, and is within the scope of the invention.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

For example, the methods according to the present invention may be stored in a storage medium (e.g., an internal memory, a flash memory, a hard disk, etc.) and may be implemented as code or commands in a software program that can be executed by a processor (e.g., a microprocessor), which will be described with reference to FIG. 9.

Figure 9:
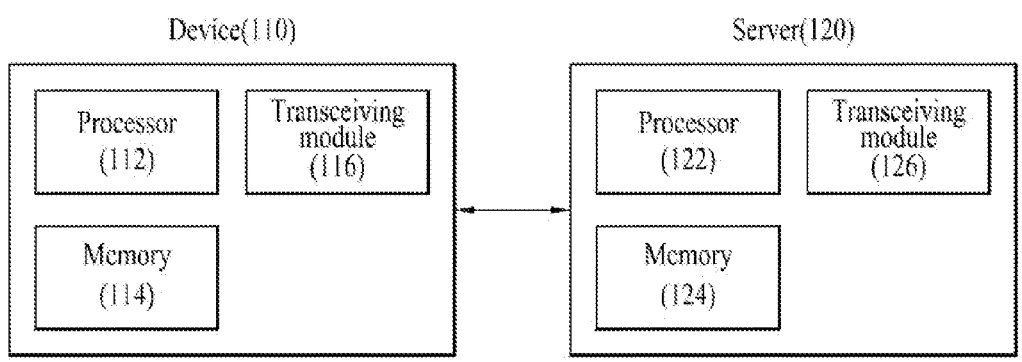
FIG. 9 illustrates a device and a server to which the present invention is applicable.

FIG. 9 illustrates a device 100 and a server 120 to which the present invention is applicable.

As illustrated in FIG. 9, the device 110 to which the present invention is applicable includes a processor 112, a memory 114, and a transceiving module 116. In addition, the server 120 to which the present invention is applicable includes a processor 122, a memory 124, and a transceiving module 126.

The memories 114 and 124 may be connected to the processor 112 and may store various pieces of information associated with an operation of the processor 112 as well as a software program or commands for execution of the methods illustrated in FIGS. 5 to 8.

The processors 112 and 122 are connected to the memories 112 and 122 and the transceiving modules 116 and 126 and controls them. In detail, the processors 112 and 212 may execute the software program or command stored in the memories 112 and 122 to perform methods. In addition, the processors 112 and 212 transmit the aforementioned signals through the transceiving modules 116 and 126.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention is applicable to a communication apparatus such as a user equipment (UE), a server, etc.

The invention claimed is:

1. A method for switching a personal network gateway (PN GW) in a personal network (PN) by to a first device, while the first device is in a personal network element (PNE) mode, from a second device which is currently in a PN GW mode or a PNE and PN GW (BOTH) mode, the method comprising:

transmitting, by the first device to the second device, a first message for request PN GW switching;

receiving, by the first device, a second message from the second device in response to the first message, the second message including a value indicating success corresponding to acceptance of the PN GW switching request;

switching, by the first device, a mode of the first device from the PNE mode to the PN GW mode or the BOTH mode;

performing, by the first device, a PN GW authentication procedure with a converged personal network service (CPNS) server:

transmitting, by the first device to the CPNS server, a third message to request PN GW switching;

receiving, by the first device from the CPNS server, a fourth message in response to the third message, the fourth message indicating that the request of the PN GW switching is accepted; and updating, by the first device, a local PN inventory and creating a service group (SG) inventory;

transmitting, by the first device, a PN GW change notification message to all PNEs in the PN; and resuming, by the first device, a service suspended by the second device, wherein the suspended service is resumed by a PN GW entity of the first device.

2. The method according to claim 1, wherein:
the first message is transmitted to a PN GW entity of the second device from a PNE entity of the first device; and
the second message is transmitted to the PNE entity of the first device from the PN GW entity of the second device.

3. The method according to claim 1, wherein:
the third message is transmitted by a PN GW entity of the first device;
the fourth message is received by the PN GW entity of the first device; and
the PN GW change notification message is transmitted by the PN GW entity of the first device.

4. A device for switching a personal network gateway (PN GW) in a personal network (PN), while the device is in a personal network element (PNE) mode, from a second device which is currently in a PN GW mode or a PNE and PN GW (BOTH) mode, the device comprising:
a transmitter;
a receiver; and
a processor configured to operate as a PNE entity or a PN GW entity;
wherein, while operating as the PNE entity, the processor is configured to:
transmit a first message for request of PN GW switching to a PN GW entity of the second device;
receive a second message from the PN GW entity of the second device in response to the first message, the second message including a value indicating success corresponding to acceptance of the PN GW switching request; and
wherein the processor is further configured to switch a mode of the first device from the PNE mode to the PN GW mode or the BOTH mode such that the processor operates as the PN GW entity;
wherein, while operating as the PN GW entity, the processor is configured to:
perform a PN GW authentication procedure with a converged personal network service (CPNS) server:
transmit a third message to the CPNS server to request PN GW switching;
receive a fourth message from the CPNS server in response to the third message,
the fourth message indicating that the request of the PN GW switching is accepted; and
update a local PN inventory and creating a service group (SG) inventory,
transmit a PN GW change notification message to all PNEs in the PN; and
resume a service suspended by the second device,
wherein the suspended service is resumed by a PN GW entity of the first device.

* * * * *